(12) United States Patent
Zhou et al.

(10) Patent No.: US 9,972,416 B2
(45) Date of Patent: May 15, 2018

(54) MODIFIED ETHYLENE-BASED POLYMER COMPOSITIONS AND METHODS OF THEIR PRODUCTION

(71) Applicant: Dow Global Technologies LLC, Midland, MI (US)

(72) Inventors: Huajun Zhou, New City, NY (US); Chester J. Kmiec, Phillipsburg, NJ (US)

(73) Assignee: Dow Global Technologies LLC, Midland, MI (US)

( * ) Notice: Subject to any disclaimer, the term of this patent is extended or adjusted under 35 U.S.C. 154(b) by 352 days.

(21) Appl. No.: 14/417,008

(22) PCT Filed: Sep. 12, 2013

(86) PCT No.: PCT/US2013/059385
§ 371 (c)(1),
(2) Date: Jan. 23, 2015

(87) PCT Pub. No.: WO2014/052017
PCT Pub. Date: Apr. 3, 2014

(65) Prior Publication Data
US 2015/0294755 A1    Oct. 15, 2015

Related U.S. Application Data

(60) Provisional application No. 61/705,348, filed on Sep. 25, 2012.

(51) Int. Cl.
| | | |
|---|---|---|
| *C09D 123/06* | (2006.01) | |
| *C09D 123/08* | (2006.01) | |
| *H01B 3/44* | (2006.01) | |
| *C08L 23/06* | (2006.01) | |

(52) U.S. Cl.
CPC .............. *H01B 3/441* (2013.01); *C08L 23/06* (2013.01); *C09D 123/06* (2013.01); *C09D 123/0815* (2013.01)

(58) Field of Classification Search
CPC ..... H01B 3/441; C08L 23/06; C08L 23/0815; C09D 123/06; C09D 123/0815
USPC .......................................... 524/528; 525/240
See application file for complete search history.

(56) References Cited

U.S. PATENT DOCUMENTS

| 2004/0249080 A1 | 12/2004 | Shankernarayanan et al. |
| 2007/0049682 A1 | 3/2007 | Walsh |
| 2009/0105417 A1 | 4/2009 | Walton et al. |
| 2011/0186328 A1* | 8/2011 | Easter .................... H01B 3/448 |
| | | 174/102 SC |

FOREIGN PATENT DOCUMENTS

| WO | 2004014997 | 2/2004 |
| WO | 2005/056670 | 6/2005 |
| WO | 2007053603 | 5/2007 |

OTHER PUBLICATIONS

George Wypych, Ed., "13.28 Wire and Cable," Handbook of Plasticizers, ChemTecPublishing, William Andrew Publishing, pp. 452-453 (2004).*
Tembhekar et al., "High Strength-Low Hardness Thermoplastic Elastomers from Ethylene-Butene Copolymers and Low Density Polyethylene," Rubber Chemistry and Technology, vol. 81, No. 1, American Chemical Society, Rubber Division, pp. 60-76 (2008).*
PCT/US2013/059385, International Search Report and Written Opinion of the International Searching Authority, dated Jan. 13, 2014, pp. 1-7.
PCT/ US2013/059385, International Preliminary Report on Patentability, dated Mar. 31, 2015, pp. 1-4.

* cited by examiner

*Primary Examiner* — Josephine L Chang

(57) ABSTRACT

Polymeric compositions comprising an ethylene-based thermoplastic polymer and an olefinic thermoplastic elastomer. Processes for producing polymeric compositions comprising an ethylene-based thermoplastic polymer and an olefinic thermoplastic elastomer. Such polymeric compositions can be employed in forming coated wires and cables.

6 Claims, No Drawings

MODIFIED ETHYLENE-BASED POLYMER COMPOSITIONS AND METHODS OF THEIR PRODUCTION

REFERENCE TO RELATED APPLICATIONS

The present application claims the benefit of U.S. Provisional Application No. 61/705,348, filed on Sep. 25, 2012.

FIELD

Various embodiments of the present invention relate to polymeric compositions comprising an olefinic thermoplastic elastomer and an ethylene-based thermoplastic polymer. Other aspects of the invention concern wire or cable coatings comprising such polymeric compositions.

INTRODUCTION

Cables, such as power or communication cables, typically include a core, which comprises a conducting element such as a metal wire or a glass fiber, and one or more outer layers for shielding and protecting purposes. The outermost of these layers, having mainly protective purposes, is usually referred to as the outer sheath or jacket. Cable types include fiber-optic cables, telephone cables, coaxial cables, radio frequency cables, network cables, signal wires, and power cables.

The use of polymeric materials to manufacture cable jackets is generally known. In general, the polymeric material used to manufacture cable jackets should possess good processability (e.g., good extrusion properties) over broad processing temperature ranges. Furthermore, such cable jackets should generally possess good mechanical properties, such as good environmental stress crack resistance ("ESCR"), good mechanical strength, and good surface finish. In some applications, it is desired to have increased flexibility in the cable jacket. Flexibility can be more important in the final 100 feet to the end user.

Polyvinyl chloride ("PVC") is typically used for jackets due to good weather resistance, good flexibility, and low cost. PVC generally performs well in the temperature range of 0° F. (−17.8° C.) to 120° F. (49° C.). At temperatures below 0° F., PVC jackets become more rigid making them more difficult to handle and make good connections. Alternatively, at higher temperatures, PVC can be too flexible or soft, thus making tight connections more difficult. During cable installation at low temperatures, an installer must heat the jacket to enable the connecting process. Consequently, cable installation at high temperatures can cause PVC to undesirably stretch. Accordingly, improvements in wire and cable coatings are desired.

SUMMARY

One embodiment is a composition comprising:
(1) an ethylene-based thermoplastic polymer selected from the group consisting of low-density polyethylene ("LDPE"), linear-low-density polyethylene ("LLDPE"), very-low-density polyethylene ("VLDPE"), and combinations of two or more thereof; and
(2) an olefinic thermoplastic elastomer selected from the group consisting of an ethylene-α-butene copolymer, an ethylene-α-hexene copolymer, an ethylene-α-octene copolymer, and combinations of two or more thereof,
wherein said composition has a tensile elasticity (E') at −20° C. of 750 megapascals ("MPa") or less, wherein said polymeric composition has an E' at 60° C. of at least 20 MPa.

Another embodiment is a composition comprising:
a coated conductor comprising:
(1) a core; and
(2) a jacket at least partially surrounding said core,
wherein said jacket is at least partially composed of a polymeric composition comprising an ethylene-based thermoplastic polymer and an olefinic thermoplastic elastomer.

DETAILED DESCRIPTION

Various embodiments of the present invention concern polymeric compositions for use in wire or cable coatings. Such polymeric compositions comprise an ethylene-based thermoplastic polymer and an olefinic thermoplastic elastomer.

Polymeric Composition

As noted above, one component of the polymeric compositions described herein is an ethylene-based thermoplastic polymer. As used herein, "ethylene-based" polymers are polymers prepared from ethylene monomers as the primary (i.e., greater than 50 weight percent ("wt %")) monomer component, though other co-monomers may also be employed. As known in the art, "thermoplastic" polymers are typically un-crosslinked polymers that become softer upon heating. Thus, in various embodiments, the ethylene-based thermoplastic polymer is non-crosslinked. "Polymer" means a macromolecular compound prepared by reacting (i.e., polymerizing) monomers of the same or different type. "Polymer" includes homopolymers and interpolymers. "Interpolymer" means a polymer prepared by the polymerization of at least two different monomer types. This generic term includes copolymers (usually employed to refer to polymers prepared from two different monomer types), and polymers prepared from more than two different monomer types (e.g., terpolymers (three different monomer types) and tetrapolymers (four different monomer types)).

In various embodiments, the ethylene-based thermoplastic polymer can be an ethylene homopolymer. As used herein, "homopolymer" denotes a polymer comprising repeating units derived from a single monomer type, but does not exclude residual amounts of other components used in preparing the homopolymer, such as chain transfer agents.

In an embodiment, the ethylene-based thermoplastic polymer can be an ethylene/alpha-olefin ("α-olefin") interpolymer having an α-olefin content of at least 1 wt %, at least 5 wt %, at least 10 wt %, at least 15 wt %, at least 20 wt %, or at least 25 wt % based on the entire interpolymer weight. These interpolymers can have an α-olefin content of less than 50 wt %, less than 45 wt %, less than 40 wt %, or less than 35 wt % based on the weight of the interpolymer.

When an α-olefin is employed, the α-olefin can be a $C_{3-20}$ (i.e., having 3 to 20 carbon atoms) linear, branched, or cyclic α-olefin. Examples of $C_{3-20}$ α-olefins include propene, 1-butene, 4-methyl-1-pentene, 1-hexene, 1-octene, 1-decene, 1-dodecene, 1-tetradecene, 1-hexadecene, and 1-octadecene. The α-olefins can also have a cyclic structure such as cyclohexane or cyclopentane, resulting in an α-olefin such as 3-cyclohexyl-1-propene (allyl cyclohexane) and vinyl cyclohexane. Illustrative ethylene/α-olefin interpolymers include ethylene/propylene, ethylene/butene, ethylene/

1-hexene, ethylene/1-octene, ethylene/styrene, ethylene/propylene/1-octene, ethylene/propylene/butene, and ethylene/butene/1-octene.

In various embodiments, the ethylene-based thermoplastic polymer can be used alone or in combination with one or more other types of ethylene-based thermoplastic polymers (e.g., a blend of two or more ethylene-based thermoplastic polymers that differ from one another by monomer composition and content, catalytic method of preparation, etc). If a blend of ethylene-based thermoplastic polymers is employed, the polymers can be blended by any in-reactor or post-reactor process.

In various embodiments, the ethylene-based thermoplastic polymer can be selected from the group consisting of low-density polyethylene ("LDPE"), linear-low-density polyethylene ("LLDPE"), very-low-density polyethylene ("VLDPE"), and combinations of two or more thereof.

In an embodiment, the ethylene-based thermoplastic polymer can be an LDPE. LDPEs are generally highly branched ethylene homopolymers, and can be prepared via high pressure processes. LDPEs suitable for use herein can have a density ranging from 0.910 to 0.930 g/cm$^3$, from 0.917 to 0.925 g/cm$^3$, or from 0.919 to 0.924 g/cm$^3$. Polymer densities provided herein are determined according to ASTM International ("ASTM") method D792. LDPEs suitable for use herein can have a melt index ($I_2$) ranging from 0.1 to 8.0 g/10 min. Melt indices provided herein are determined according to ASTM method D1238. Unless otherwise noted, melt indices are determined at 190° C. and 2.16 Kg (a.k.a., $I_2$). Generally, LDPEs have a broad molecular weight distribution ("MWD") resulting in a high polydispersity index ("PDI;" ratio of weight-average molecular weight to number-average molecular weight). LDPEs suitable for use herein can have a PDI ranging from 4.0 to 12.0. PDIs provided herein are determined by gel permeation chromatography.

Examples of commercially available LDPEs that can be employed include DFDA-1253 NT; Dow™ LDPE 132i; Dow™ LDPE 133A; Dow™ LDPE 501i; and Dow™ LDPE 535i, all available from The Dow Chemical Company, Midland, Mich., USA.

In an embodiment, the ethylene-based thermoplastic polymer can be an LLDPE. LLDPEs are generally ethylene-based polymers having a heterogeneous distribution of comonomer (e.g., α-olefin monomer), and are characterized by short-chain branching. For example, LLDPEs can be copolymers of ethylene and α-olefin monomers, such as those described above. LLDPEs suitable for use herein can have a density ranging from 0.917 to 0.941 g/cm$^3$, from 0.918 to 0.930 g/cm$^3$, or from 0.918 to 0.922 g/cm$^3$. LLDPEs suitable for use herein can have a melt index ($I_2$) ranging from 0.2 to 1.5 g/10 min, from 0.3 to 1.0 g/10 min, or from 0.5 to 0.8 g/10 min LLDPEs suitable for use herein can have a PDI ranging from 2.5 to 16.

Examples of commercially available LLDPEs that can be employed include DFDA-7530 NT, and DFDA-7540 NT, both available from The Dow Chemical Company, Midland, Mich., USA.

In an embodiment, the ethylene-based thermoplastic polymer can be a VLDPE. VLDPEs may also be known in the art as ultra-low-density polyethylenes, or ULDPEs. VLDPEs are generally ethylene-based polymers having a heterogeneous distribution of comonomer (e.g., α-olefin monomer), and are characterized by short-chain branching. For example, VLDPEs can be copolymers of ethylene and α-olefin monomers, such as one or more of those α-olefin monomers described above. VLDPEs suitable for use herein can have a density ranging from 0.880 to 0.910 g/cm$^3$, or from 0.883 to 0.886 g/cm$^3$. VLDPEs suitable for use herein can have a melt index ($I_2$) ranging from 0.5 to 2.5 g/10 min, from 0.55 to 1.0 g/10 min, or from 0.60 to 0.90 g/10 min VLDPEs suitable for use herein can have a PDI ranging from 3 to 6, or from 4 to 5.

Examples of commercially available VLDPEs that can be employed include FLEXOME® VLDPEs, such as DFDB-1085 NT, DFDA-1137 NT, ETS 9078 NT7, and ETS 9066 NT7, each available from The Dow Chemical Company, Midland, Mich., USA.

In an embodiment, the ethylene-based thermoplastic polymer can comprise a combination of any two or more of the above-described ethylene-based thermoplastic polymers.

Production processes used for preparing ethylene-based thermoplastic polymers are wide, varied, and known in the art. Any conventional or hereafter discovered production process for producing ethylene-based thermoplastic polymers having the properties described above may be employed for preparing the ethylene-based thermoplastic polymers described herein.

As noted above, the above-described ethylene-based thermoplastic polymer is combined with an olefinic thermoplastic elastomer to form a polymeric composition. As known in the art, thermoplastic elastomers are polymers having characteristics of both thermoplastic polymers and elastomeric polymers. As used herein, the term "olefinic" when used to modify the phrase "thermoplastic elastomer" denotes a thermoplastic elastomer interpolymer prepared from two or more types of α-olefin monomers. In general, olefinic thermoplastic elastomers can be substantially linear and can have a substantially homogeneous distribution of comonomer.

In various embodiments, the olefinic thermoplastic elastomer is prepared from ethylene and one or more additional types of α-olefin comonomers. In one or more embodiments, the olefinic thermoplastic elastomer is a copolymer of ethylene and an α-olefin comonomer. The α-olefin monomers suitable for use in the olefinic thermoplastic elastomers include ethylene and any of the α-olefin monomer types described above as suitable for use as comonomers in the ethylene-based thermoplastic polymer. In various embodiments, the olefinic thermoplastic elastomer is a copolymer of ethylene/α-butene, ethylene/α-hexene, ethylene/α-octene, or combinations of two or more thereof.

In one embodiment, olefinic thermoplastic elastomer is a homogeneously branched linear ethylene/α-olefin copolymer or a homogeneously branched, substantially linear ethylene/α-olefin copolymer. In a further embodiment, the α-olefin is selected from propylene, 1-butene, 1-hexene, or 1-octene, and preferably from 1-butene, 1-hexene or 1-octene, and more preferably from 1-octene or 1-butene.

Olefinic thermoplastic elastomers suitable for use herein can have a density ranging from 0.85 to 0.93 g/cm$^3$, 0.86 to 0.91 g/cm$^3$, from 0.87 to 0.90 g/cm$^3$, or from 0.87 to 0.89 g/cm$^3$. Olefinic thermoplastic elastomers suitable for use herein can have a melt index ($I_2$) ranging from 0.1 to 30 g/10 min, from 0.1 to 15 g/10 min., from 0.2 to 10 g/10 min., from 0.3 to 5 g/10 min., or from 0.5 to 2 g/10 min. Olefinic thermoplastic elastomers suitable for use herein can have a PDI ranging from 1.1 to 5, from 1.2 to 4.0, from 2.2 to 3.5, or from 1.5 to 3.

Production processes used for preparing olefinic thermoplastic elastomers are wide, varied, and known in the art. Any conventional or hereafter discovered production process for producing olefinic thermoplastic elastomers having the properties described above may be employed for preparing the olefinic thermoplastic elastomers described herein.

Commercial examples of olefinic thermoplastic elastomers suitable for use herein include ENGAGE™ polyolefin elastomers (e.g., ENGAGE™ 8100, 8003, 8401, 8411, 8842, 8200, 7447, or 7467 polyolefin elastomers) available from The Dow Chemical Company, Midland, Mich., USA.

The polymeric composition comprising the olefinic thermoplastic elastomer and the ethylene-based thermoplastic polymer can be prepared by any conventional or hereafter discovered methods for combining two polymers. For example, preparation of the polymeric composition can comprise compounding the above-described components. Compounding of the polymeric composition can be effected by standard equipment known to those skilled in the art. Examples of compounding equipment are internal batch mixers, such as a Brabender™, Banbury™, or Bolling™ mixer. Alternatively, continuous single or twin screw mixers can be used, such as a Farrel™ continuous mixer, a Werner and Pfleiderer™ twin screw mixer, or a Buss™ kneading continuous extruder. Compounding can be performed at a temperature of greater than the melting temperature of the ethylene-based thermoplastic polymer or greater than the melting temperature of the olefinic thermoplastic elastomer, whichever is higher, and up to a temperature above which the ethylene-based thermoplastic polymer begins to degrade or up to a temperature at which the olefinic thermoplastic elastomer begins to degrade, whichever is lower. In various embodiments, compounding can be performed at a temperature ranging from 120 to 230° C., or from 130 to 190° C.

In one or more embodiments, the polymeric composition can comprise the ethylene-based thermoplastic polymer in an amount ranging from 25 to 85 wt %, from 30 to 85 wt %, from 40 to 80 wt %, from 45 to 80 wt %, or from 50 to 75 wt %, based on the entire polymeric composition weight. Additionally, the polymeric composition can comprise the olefinic thermoplastic elastomer in an amount ranging from 1 to 75 wt %, from 5 to 60 wt %, from 10 to 50 wt %, or from 25 to 50 wt %, based on the entire polymeric composition weight.

In various embodiments, addition of the olefinic thermoplastic elastomer to the above-described ethylene-based thermoplastic polymer can "flexibilize" the ethylene-based thermoplastic polymer. In other words, addition of an olefinic thermoplastic elastomer can lower the tensile elasticity of the ethylene-based thermoplastic elastomer.

In various embodiments, addition of the olefinic thermoplastic elastomer can lower the low-temperature tensile elasticity (E') of the ethylene-based thermoplastic polymer by at least 25%, at least 50%, or at least 75%, and up to 85%, as determined at −20° C. Values for E' provided herein are determined according to the procedures provided in the Test Methods section, below. Furthermore, in one or more embodiments, the polymeric composition comprising the ethylene-based thermoplastic polymer and olefinic thermoplastic elastomer can have a low-temperature E' of 750 megapascals ("MPa") or less, 500 MPa or less, 450 MPa or less, 400 MPa or less, 350 MPa or less, 300 MPa or less, or 250 MPa or less, as determined at −20° C. In such embodiments, the polymeric composition can have a minimum low-temperature E' of 100 MPa.

In various embodiments, the addition of the olefinic thermoplastic elastomer does not excessively lower the high-temperature E' of the ethylene-based thermoplastic polymer. Thus, in one or more embodiments, the polymeric composition comprising the ethylene-based thermoplastic polymer and olefinic thermoplastic elastomer can have a high-temperature E' of at least 20 MPa, at least 25 MPa, at least 30 MPa, at least 35 MPa, at least 40 MPa, at least 45 MPa, or at least 50 MPa, as determined at 60° C. In such embodiments, the polymeric composition can have a maximum high-temperature E' of 110 MPa.

In various embodiments, the difference between the low-temperature E' and the high-temperature E' (i.e., E' at −20° C. minus E' at 60° C.; or ΔE') can be minimized. In one or more embodiments, the polymeric composition can have a ΔE' of 650 MPa or less, 500 MPa or less, 450 MPa or less, 400 MPa or less, 350 MPa or less, 300 MPa or less, 250 MPa or less, or 200 MPa or less.

In one or more embodiments, the polymeric composition can further comprise process oil. Process oil is an additive that provides benefits of increased flexibility, lower hardness, improved processability, increased melt index, increased elongation of the compound, and lower glass-transition temperature ("Tg") of materials. Process oils (a.k.a., plasticizers) include, but are not limited to, petroleum oils, such as aromatic and naphthenic oils; polyalkylbenzene oils; organic acid monoesters, such as alkyl and alkoxyalkyl oleates and stearates; organic acid diesters, such as dialkyl, dialkoxyalkyl, and alkyl aryl phthalates, terephthalates, sebacates, adipates, and glutarates; glycol diesters, such as tri-, tetra-, and polyethylene glycol dialkanoates; trialkyl trimellitates; trialkyl, trialkoxyalkyl, alkyl diaryl, and triaryl phosphates; chlorinated paraffin oils; coumarone-indene resins; pine tars; and vegetable oils, such as castor, tall, rapeseed, and soybean oils and esters and epoxidized derivatives thereof. Exemplary process oils suitable for use herein include paraffinic, aromatic and naphthenic petroleum oils. Exemplary commercial process oils include SUNDEX™ 790 aromatic oil, and SUNPAR RANGE™ 2280, 150, 120, and 110 paraffinic process oils from Sunoco Inc., Philadelphia, Pa., USA. When employed, the process oil can be present in the polymeric composition in an amount ranging from 1 to 30 wt %, from 5 to 25 wt %, or from 10 to 20 wt %, based on the entire polymeric composition weight.

Additionally, an antioxidant can be employed with the polymeric composition. Exemplary antioxidants include hindered phenols (e.g., tetrakis [methylene (3,5-di-t-butyl-4-hydroxyhydrocinnamate)]methane); phosphites and phosphonites (e.g., tris (2,4-di-t-butylphenyl)phosphate); thio compounds (e.g., dilaurylthiodipropionate); various siloxanes; and various amines (e.g., polymerized 2,2,4-trimethyl-1,2-dihydroquinoline). Antioxidants can be used in amounts of 0.1 to 5 wt % based on the total polymeric composition weight. In the formation of wire and cable compositions, antioxidants are typically added to the system before processing (i.e., prior to extrusion) of the finished article.

The polymeric composition may also contain other additives including, but not limited to, processing aids, ultraviolet absorbers or stabilizers, antistatic agents, slip agents, anti-blocking agents, carbon blacks (e.g., with typical arithmetic mean particle sizes larger than 15 nanometers), and metal deactivators. Additives, other than fillers, are typically used in amounts ranging from 0.01 or less to 5 or more wt % based on total composition weight.

In various embodiments, the polymeric composition is not an additive-filled system. In other words, in some embodiments, the polymeric composition is free or substantially free of fillers, such as clays, precipitated silica and silicates, fumed silica, calcium carbonate, ground minerals, aluminum trihydroxide, and magnesium hydroxide. Thus, in various embodiments, the polymeric composition consists of, or consists essentially of, the above-described ethylene-based thermoplastic polymer and the above-described olefinic thermoplastic elastomer, with one or more antioxidants and one or more process oils being optional.

Coated Conductor

In application, the above-described polymeric composition may be used to manufacture shaped articles. Such articles may include, but are not limited to, power or communication cable jackets, or power or communication cable insulation products. Different methods may be employed to manufacture articles such as power or communication cable jackets, or power or communication cable insulation products. Suitable conversion techniques include, but are not limited to, wire coating via extrusion. Such techniques are generally well known.

"Cable" and "power cable" mean at least one wire or optical fiber within a sheath (e.g., an insulation covering and/or a protective outer jacket). Typically, a cable is two or more wires or optical fibers bound together, usually in a common insulation covering and/or protective jacket. The individual wires or fibers inside the sheath may be bare, covered or insulated. Combination cables may contain both electrical wires and optical fibers. The cable can be designed for low, medium, and/or high voltage applications. Typical cable designs are illustrated in ("USP") U.S. Pat. Nos. 5,246,783, 6,496,629, and 6,714,707. "Conductor" denotes one or more wire(s) or fiber(s) for conducting heat, light, and/or electricity. The conductor may be a single-wire/fiber or a multi-wire/fiber and may be in strand form or in tubular form. Non-limiting examples of suitable conductors include carbon and various metals, such as silver, gold, copper, and aluminum. The conductor may also be optical fiber made from either glass or plastic.

Such a coated conductor can be prepared with various types of extruders (e.g., single or twin screw types) by extruding the polymeric composition onto the conductor. A description of a conventional extruder can be found in U.S. Pat. No. 4,857,600. An example of co-extrusion and an extruder therefore can be found in U.S. Pat. No. 5,575,965.

In an embodiment, the process includes forming a cross-link-free coating on the conductor. Accordingly, in various embodiments, the above-described polymeric composition is cross-link free or substantially cross-link free.

The coating may also be an outer layer (also referred to as a "jacket" or a "sheath"). The coating may wholly or partially cover or otherwise surround or encase the conductor. The coating may be the sole component surrounding the conductor. Alternatively, the coating may be one layer of a multilayer jacket or sheath encasing the conductor.

Non-limiting examples of suitable coated conductors include flexible wiring such as wiring for consumer electronics, a power cable, a power charger wire for cell phones and/or computers, computer data cords, power cords, appliance wiring material, and consumer electronic accessory cords. In various embodiments, the coated conductor is a drop wire.

Test Methods

Density

Determine density according to ASTM D792.

Melt Index

Measure melt index, or $I_2$, in accordance by ASTM D1238, condition 190° C./2.16 kg, and report in grams eluted per 10 minutes. Measure $I_{10}$ in accordance with ASTM D1238, condition 190° C./10 kg, and report in grams eluted per 10 minutes.

Tensile Elasticity (Dynamic Mechanical Analysis)

Measure the tensile elasticity (E'), otherwise referred to as the real or elastic component of the Young's modulus, by testing a compression-molded plaque using a DMA Q800 made by TA Instruments Inc. The data are collected with the use of a Dynamic Mechanical Analysis ("DMA") bending test procedure using a single cantilever setup, wherein the sample is mounted onto a stationary clamp at one end, while the other end is mounted onto a moveable clamp. The moveable clamp then bends the sample in a sinusoidal motion by applying a small strain percent of 0.025% during the test. The frequency of the bending motion is 1 Hz. While sample is being bent, it goes through a temperature ramp program from −30° C. to +90° C. via a rate increase of 3° C. per minute. The resulting measurements are then processed by the standard machine software, and the E' (and E", the viscous analog) data are reported.

In a bending DMA procedure, the machine applies a prescribed force and then directly measures the amplitude of the sample's deformation and the phase angle of the responding force. In its simplest form (i.e., as a function of time rather than frequency), a material's stiffness may be calculated according to:

$$K = \frac{\text{force applied}}{\text{amplitude of deformation}}$$

The material's Geometry Factor (GF) is defined as:

$$GF = \frac{L}{A}$$

where L=sample's length, A=sample's cross-sectional area, and the Young's modulus is then calculated as:

$$E = K^*(GF)$$

However, it is also possible to re-express Young's modulus as a dynamic modulus—E*, a function of frequency, or ω—composed of its in-phase and out-of-phase components (E' and E" as introduced above) so as to enable the calculation of those elastic and viscous-specific parameters. Tensile elasticity (E') can be calculated, for example, by the first formula below, where δ is the phase angle of the responding force from the experiment:

$$E' = (\text{stress/strain})\cos(\delta)$$

$$E'' = (\text{stress/strain})\sin(\delta)$$

$$E^*(\omega) = E'(\omega) + iE''(\omega)$$

And tan delta, in bending deformation test, is coincidentally then related to the dynamic moduli according to:

$$\text{Tan}(\delta) = \frac{E''}{E'}$$

As a technical reference for the above discussion, see, for example: Young, R. J. and Lovell, P. A, *Introduction to Polymers*, Second Edition, CRC Press, 1991, Chapter 5.

EXAMPLES

Example 1 (Comparative)—Tensile Elasticity of Polyvinyl Chloride

Analyze two polyvinyl chloride ("PVC") samples (CS1 and CS2; each 100 wt % PVC) for tensile elasticity at −20°

C., 20° C., and 60° C. according to the above-described Test Methods. The flexible PVC sample utilized is a PVC product having a density of 1.35 g/cc and a Shore A hardness of 79.9. Results are provided in Table 1, below.

TABLE 1

Properties of PVC Samples

| Sample No. | E' at −20° C. (MPa) | E' at 20° C. (MPa) | E' at 60° C. (MPa) | ΔE' from −20 to 60° C. (MPa) |
|---|---|---|---|---|
| CS1 | 910 | 47 | 7 | 903 |
| CS2 | 781 | 48 | 10 | 771 |

The results from Table 1 show that, while PVC offers a fair balance of workability, durability, and toughness at temperatures of 20° C., it exhibits less flexibility or increased stiffness at low temperatures, while having poorer mechanical durability and toughness at high temperatures.

Example 2—Flexibilized LLDPE

Prepare fourteen samples (S1-S14) and one comparative sample (CS3) according to the compositions listed in Table 2, below. Prepare S1-S14 according to the following procedure. A laboratory electric batch mixer is equipped with roller blades. The mixer is a Prep-Mixer® manufactured by C.W. Brabender and is equipped with a Mixer/Measuring Head having a 3-piece design consisting of two heating zones with a capacity of 350 mL. Set the mixer temperature at 180° C. and pre-heat to this temperature. Feed the pre-measured base resin (ethylene-based thermoplastic polymer) into the bowl until full flux at 15 rpm. Then add the olefinic thermoplastic elastomer, followed by the antioxidant, until full flux at 15 rpm. Add oil, if applicable, slowly at the 15 rpm speed to allow for sufficient incorporation into the polymer. Then raise the speed to 40 rpm. Mix the full compound at 40 rpm for 5 minutes and remove.

Compression mold the mixed compound into a plaque utilizing the following procedure: produce an 8"×8"×50 mils plaque using a Wabash electric press operated in the manual mode. First preheat the press to 179° C. (±5° C.). Pre-weigh a total of 65 grams of material and place it in the center of a 50-mil stainless steel plaque between the mold assembly made up of mold-release-treated mylar and aluminum sheets. Then place the filled mold into the press at 500 psi for 5 minutes. After 5 minutes, increase the pressure to 2,500 psi for 10 minutes. Then slow cool the plaque at a rate of −15° C. per minute and remove when the temperature reaches room temperature. Note: for the PVC sample (as in Example 1), 85 grams are utilized to fill the mold. A test sample is cut from the molded plaque into a rectangular strip with a size of 17.5 mm×13 mm×~1.5 mm. The sample is then tested according to the DMA procedures described in the Test Methods section, above.

The LLDPE employed in this example is DFDA-7530 NT, available from The Dow Chemical Company, Midland, Mich., USA. DFDA-7530 NT has a density ranging from 0.918 to 0.922 g/cm$^3$, and a melt index ($I_2$) of from 0.50 to 0.80 g/10 min ENGAGE™ 8842 and ENGAGE™ 8200 are ethylene-octene olefinic thermoplastic elastomers available from The Dow Chemical Company, Midland, Mich., USA. ENGAGE™ 8842 has a density ranging from 0.854 to 0.860 g/cm$^3$, an $I_2$ of from 0.75 to 1.25 g/10 min, a total crystallinity of 13%, a Shore A hardness of 54, a DSC melting peak of 38° C. (rate 10° C./min), and a glass transition temperature ("Tg") of −58° C. (DSC deflection point). ENGAGE™ 8200 has a density ranging from 0.867 to 0.873 g/cm$^3$, an $I_2$ of from 4.0 to 6.0 g/10 min, a total crystallinity of 19%, a Shore A hardness of 66, a DSC melting peak of 59° C. (rate 10° C./min), and a Tg of −53° C. (DSC deflection point). ENGAGE™ 7447 and ENGAGE™ 7467 are ethylene-butene olefinic thermoplastic elastomers available from The Dow Chemical Company, Midland, Mich., USA. ENGAGE™ 7447 has a density ranging from 0.862 to 0.868 g/cm$^3$, an $I_2$ of from 4.0 to 6.0 g/10 min., a total crystallinity of 13%, a Shore A hardness of 64, a DSC melting peak of 25° C. (rate 10° C./min), and a Tg of −53° C. (DSC deflection point). ENGAGE™ 7467 has a density ranging from 0.859 to 0.865 g/cm$^3$, an $I_2$ of from 1.0 to 1.4 g/10 min, a total crystallinity of 12%, a Shore A hardness of 52, a DSC melting peak of 34° C. (rate 10° C./min), and a Tg of −58° C. (DSC deflection point). The process oil is a paraffinic petroleum oil sold under the brand name SUNPAR™ 150, available from Holly Refining & Marketing—Tulsa, LLC, Tulsa, Okla., USA. The antioxidant is a sterically hindered phenolic antioxidant (pentaerythritol tetrakis(3-(3,5-di-tert-butyl-4-hydroxyphenyl)propionate)) sold under the brand name IRGANOX™ 1010, available from BASF SE, Ludwigshafen, Germany (formerly Ciba Specialty Chemicals).

TABLE 2

LLDPE Sample Compositions

| Sample No. | LLDPE (wt %) | Engage ™ 8842 (wt %) | Engage ™ 8200 (wt %) | Engage ™ 7447 (wt %) | Engage ™ 7467 (wt %) | Process Oil (wt %) | Antioxidant (wt %) |
|---|---|---|---|---|---|---|---|
| S1 | 75 | — | — | — | 25 | — | — |
| S2 | 50 | — | — | — | 50 | — | — |
| S3 | 25 | — | — | — | 75 | — | — |
| S4 | 40 | — | — | — | 50 | 10 | — |
| S5 | 33 | — | — | — | 42 | 25 | — |
| S6 | 67.9 | — | — | — | 22 | 10 | 0.1 |
| S7 | 49.9 | 50 | — | — | — | — | 0.1 |
| S8 | 49.9 | — | 50 | — | — | — | 0.1 |
| S9 | 49.9 | — | — | 50 | — | — | 0.1 |
| S10 | 49.9 | — | — | — | 50 | — | 0.1 |
| S11 | 39.9 | 50 | — | — | — | 10 | 0.1 |
| S12 | 39.9 | — | 50 | — | — | 10 | 0.1 |
| S13 | 39.9 | — | — | 50 | — | 10 | 0.1 |
| S14 | 49.9 | — | — | — | 40 | 10 | 0.1 |
| CS3 | 100 | — | — | — | — | — | — |

Analyze Samples S1-S14 and Comparative Sample CS3 according to the Test Methods provided above. The results from these analyses are provided in Table 3, below. Note that Comparative Sample CS3 is 100 wt % LLDPE, and is analyzed neat. Comparative Samples CS1 and CS2 from Example 1 are also reprinted in Table 3 for comparison.

TABLE 3

Properties of LLDPE Samples

| Sample No. | E' at −20° C. (MPa) | E' at 20° C. (MPa) | E' at 60° C. (MPa) | ΔE' from −20 to 60° C. (MPa) |
|---|---|---|---|---|
| S1 | 910 | 383 | 110 | 800 |
| S2 | 376 | 145 | 34 | 342 |
| S3 | 136 | 39 | 25 | 111 |
| S4 | 214 | 64 | 31 | 183 |
| S5 | 136 | 46 | 22 | 114 |
| S6 | 711 | 297 | 81 | 631 |
| S7 | 325 | 121 | 50 | 276 |
| S8 | 459 | 175 | 39 | 420 |
| S9 | 458 | 185 | 50 | 408 |
| S10 | 456 | 186 | 51 | 405 |
| S11 | 184 | 58 | 39 | 145 |
| S12 | 305 | 104 | 37 | 268 |
| S13 | 276 | 103 | 44 | 232 |
| S14 | 345 | 126 | 33 | 312 |
| CS3 | 1574 | 684 | 227 | 1347 |
| CS1 | 910 | 47 | 7 | 903 |
| CS2 | 781 | 48 | 10 | 771 |

From the results provided in Table 3, it is shown that addition of olefinic thermoplastic elastomers to LLDPE (S1-S14) provides enhanced low-temperature flexibility as compared to the un-modified LLDPE (CS3), while providing superior high-temperature performance as compared to neat PVC (CS1 and CS2). Additionally, performance increased with increasing olefinic thermoplastic elastomer (cf. S1-S3) and process oil contents (cf. S4 and S5). Furthermore, performance improvements are seen in samples containing olefinic thermoplastic elastomer additive alone and in combination with process oil.

Example 3—Flexibilized LDPE

Prepare six samples (S15-S20) and a comparative sample (CS4) according to the compositions listed in Table 4, below. Prepare S15-S20 according to the same method described above in Example 2. The LDPE employed in this example is DYNK-2, produced by the The Dow Chemical Company. DYNK-2 has a density ranging from 0.919 to 0.922 g/cm$^3$, and a melt index ($I_2$) of from 0.18 to 0.22 g/10 min. Each of the ENGAGE™ 7467, process oil, and antioxidant components are the same as described above in Example 2.

TABLE 4

LDPE Sample Compositions

| Sample No. | LDPE (wt %) | Engage ™ 7467 (wt %) | Process Oil (wt %) | Antioxidant (wt %) |
|---|---|---|---|---|
| S15 | 74.9 | 25 | — | 0.1 |
| S16 | 67.9 | 22 | 10 | 0.1 |
| S17 | 49.9 | 50 | — | 0.1 |
| S18 | 39.9 | 60 | — | 0.1 |
| S19 | 49.9 | 40 | 10 | 0.1 |
| S20 | 49.9 | 30 | 20 | 0.1 |
| CS4 | 100 | — | — | — |

Analyze Samples S15-S20 and Comparative Sample CS4 according to the Test Methods provided above. The results from these analyses are provided in Table 5, below. Note that Comparative Sample CS4 is 100 wt % LDPE, and is analyzed neat. Comparative Samples CS1 and CS2 from Example 1 are also reprinted in Table 5 for comparison.

TABLE 5

Properties of LDPE Samples

| Sample No. | E' at −20° C. (MPa) | E' at 20° C. (MPa) | E' at 60° C. (MPa) | ΔE' from −20 to 60° C. (MPa) |
|---|---|---|---|---|
| S15 | 981 | 341 | 81 | 900 |
| S16 | 676 | 220 | 51 | 625 |
| S17 | 368 | 119 | 26 | 343 |
| S18 | 248 | 82 | 28 | 220 |
| S19 | 330 | 107 | 26 | 304 |
| S20 | 355 | 111 | 32 | 324 |
| CS4 | 1598 | 545 | 123 | 1475 |
| CS1 | 910 | 47 | 7 | 903 |
| CS2 | 781 | 48 | 10 | 771 |

From the results provided in Table 5, it is shown that addition of olefinic thermoplastic elastomers to LDPE (S15-S20) provides enhanced low-temperature flexibility as compared to the un-modified LDPE (CS4), while providing superior high-temperature performance as compared to neat PVC (CS1 and CS2). Additionally, performance increased with increasing olefinic thermoplastic elastomer and process oil contents. Furthermore, performance improvements are seen in samples containing olefinic thermoplastic elastomer additive alone and in combination with process oil.

Example 4—Flexibilized VLDPE

Prepare six samples (S21-S26) and a comparative sample (CS5) according to the compositions listed in Table 6, below. Prepare S21-S26 according to the same method described above in Example 2. The VLDPE employed in this example is DFDB-1085 NT, available from The Dow Chemical Company, Midland, Mich., USA. DFDB-1085 NT has a density ranging from 0.883 to 0.886 g/cm$^3$, and a melt index ($I_2$) of from 0.60 to 0.90 g/10 min. Each of the ENGAGE® 7467, process oil, and antioxidant components are the same as described above in Example 2.

TABLE 6

VLDPE Sample Compositions

| Sample No. | VLDPE (wt %) | Engage 7467 (wt %) | Process Oil (wt %) | Antioxidant (wt %) |
|---|---|---|---|---|
| S21 | 68 | 22 | 10 | — |
| S22 | 62 | 20 | 18 | — |

TABLE 6-continued

VLDPE Sample Compositions

| Sample No. | VLDPE (wt %) | Engage 7467 (wt %) | Process Oil (wt %) | Antioxidant (wt %) |
|---|---|---|---|---|
| S23 | 79.9 | 20 | — | 0.1 |
| S24 | 89.9 | — | 10 | 0.1 |
| S25 | 79.9 | — | 20 | 0.1 |
| S26 | 69.9 | — | 30 | 0.1 |
| CS5 | 100 | — | — | — |

Analyze Samples S21-S26 and Comparative Sample CS5 according to the Test Methods provided above. The results from these analyses are provided in Table 7, below. Note that Comparative Sample CS5 is 100 wt % VLDPE, and is analyzed neat. Comparative Samples CS1 and CS2 from Example 1 are also reprinted in Table 7 for comparison.

TABLE 7

Properties of VLDPE Samples

| Sample No. | E' at −20° C. (MPa) | E' at 20° C. (MPa) | E' at 60° C. (MPa) | ΔE' from −20 to 60° C. (MPa) |
|---|---|---|---|---|
| S21 | 97 | 39 | 30 | 67 |
| S22 | 85 | 29 | 23 | 62 |
| S23 | 157 | 41 | 37 | 121 |
| S24 | 214 | 60 | 40 | 174 |
| S25 | 126 | 30 | 32 | 93 |
| S26 | 106 | 49 | 43 | 63 |
| CS5 | 255 | 79 | 15 | 240 |
| CS1 | 910 | 47 | 7 | 903 |
| CS2 | 781 | 48 | 10 | 771 |

From the results provided in Table 7, it is shown that addition of olefinic thermoplastic elastomers to VLDPE (S21-S26) provides enhanced low-temperature flexibility and improved high-temperature performance as compared to the un-modified VLDPE (CS5) and neat PVC (CS1 and CS2).

Additionally, the results provided in Table 7 indicate that, while process oil modification of the VLDPE alone provides some benefits (S24-S26), the combination of process oil and olefinic thermoplastic elastomer modification (S21 and S22) provides even better low-temperature flexibility while maintaining high temperature performance.

Example 5 (Comparative)—Ethylene-Based Polymers with Acrylate and Acetate Additives Prepare four comparative samples (CS6-CS9) according to the compositions listed in Table 8, below. Prepare CS6-CS9 according to the same method described above in Example 2. The ethylene ethyl acrylate ("EEA") polymer employed in this example is AMPLIFY™ EA 103 Functional Polymer, available from The Dow Chemical Company, Midland, Mich., USA. The EEA has a density of 0.930 g/cm$^3$, and a melt index ($I_2$) of from 18.0 to 21.0 g/10 min. The ethylene vinyl acetate ("EVA") polymer employed in this example is DXM-264, produced by The Dow Chemical Company, Midland, Mich., USA. The EVA has a density of 0.935 g/cm$^3$, and a melt index ($I_2$) of from 41 to 55 g/10 min. Each of the LDPE, LLDPE, and antioxidant components are the same as described above in Examples 2 and 3.

TABLE 8

Acrylate- and Acetate-Modified Sample Compositions

| Sample No. | LDPE (wt %) | LLDPE (wt %) | EEA (wt %) | EVA (wt %) | Antioxidant (wt %) |
|---|---|---|---|---|---|
| CS6 | 74.9 | — | 25 | — | 0.1 |
| CS7 | 74.9 | — | — | 25 | 0.1 |
| CS8 | — | 74.9 | 25 | — | 0.1 |
| CS9 | — | 74.9 | — | 25 | 0.1 |

Analyze Comparative Samples CS6-CS9 according to the Test Methods provided above. The results from these analyses are provided in Table 9, below. Comparative Samples CS3 (neat LLDPE) and CS4 (neat LDPE) from Examples 2 and 3 are also reprinted in Table 9 for comparison.

TABLE 9

Properties of Acrylate- and Acetate-Modified Samples

| Sample No. | E' at −20° C. (MPa) | E' at 20° C. (MPa) | E' at 60° C. (MPa) | ΔE' from −20 to 60° C. (MPa) |
|---|---|---|---|---|
| CS6 | 1423 | 463 | 106 | 1317 |
| CS7 | 1392 | 415 | 93 | 1299 |
| CS8 | 1271 | 525 | 154 | 1117 |
| CS9 | 1291 | 482 | 131 | 1161 |
| CS3 | 1574 | 684 | 227 | 1347 |
| CS4 | 1598 | 545 | 123 | 1475 |

From the results presented in Table 9, above, it can be seen that addition of acrylate or acetate polymers to the ethylene-based polymer does not provide adequate low-temperature flexibility of the composition.

The invention claimed is:

1. A coated conductor, comprising:
   (a) a core; and
   (b) a jacket at least partially surrounding said core,
   wherein said jacket is at least partially composed of a polymeric composition consisting of:
   (1) an ethylene-based thermoplastic polymer selected from the group consisting of low-density polyethylene ("LDPE"), linear-low-density polyethylene ("LLDPE"), very-low-density polyethylene ("VLDPE"), and combinations of two or more thereof;
   (2) an olefinic thermoplastic elastomer selected from the group consisting of an ethylene-α-butene copolymer, an ethylene-α-hexene copolymer, an ethylene-α-octene copolymer, and combinations of two or more thereof, and
   (3) optionally one or more additives selected from the group consisting of plasticizers, antioxidants, processing aids, ultraviolet absorbers or stabilizers, anti-static agents, slip agents, anti-blocking agents, carbon blacks, and metal deactivators,
   wherein said polymeric composition has a tensile elasticity (E') at −20° C. of 750 megapascals ("MPa") or less,
   wherein said polymeric composition has an E' at 60° C. of at least 20 MPa,
   wherein said polymeric composition is cross-link free.

2. The coated conductor of claim 1, wherein said polymeric composition exhibits a change in tensile elasticity (ΔE') from −20 to 60° C. of less than 650 MPa.

3. The coated conductor of claim 1, wherein said polymeric composition has an E' at −20° C. of 500 MPa or less, wherein said polymeric composition has an E' at 60° C. of at least 25 MPa, wherein said polymeric composition has a ΔE' from −20 to 60° C. of less than 500 MPa.

4. The coated conductor of claim 1, wherein said polymeric composition has an E' at −20° C. that is at least 25% less than the E' at −20° C. of an identical polymeric composition except not containing an olefinic thermoplastic elastomer.

5. The coated conductor of claim 1, wherein said polymeric composition comprises said ethylene-based thermoplastic polymer in an amount ranging from 25 to 85 weight percent, based on the entire polymeric composition weight, wherein said polymeric composition comprises said olefinic thermoplastic elastomer in an amount ranging from 1 to 75 weight percent, based on the entire polymeric composition weight.

6. The coated conductor of claim 1, wherein said polymeric composition further comprises process oil in an amount ranging from 1 to 30 weight percent, based on the entire polymeric composition weight.

* * * * *